June 9, 1936.  J. WALKER  2,043,342
FIFTH WHEEL SAFETY DEVICE FOR SEMITRAILERS
Filed May 27, 1935   3 Sheets-Sheet 1

INVENTOR.
John Walker,
BY
Hoguet, Neary & Campbell
HIS ATTORNEYS

June 9, 1936.  J. WALKER  2,043,342
FIFTH WHEEL SAFETY DEVICE FOR SEMITRAILERS
Filed May 27, 1935  3 Sheets-Sheet 2
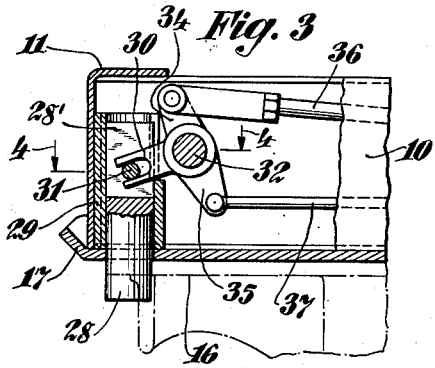
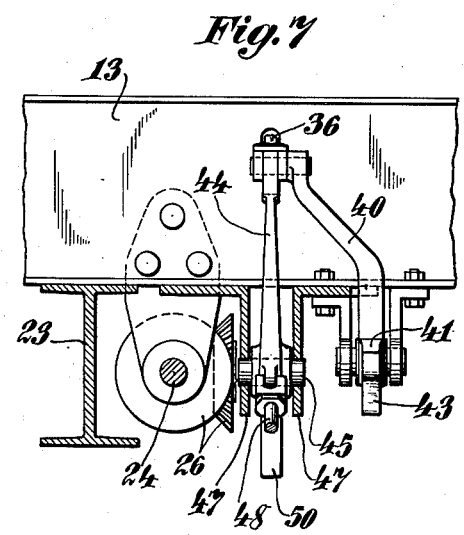
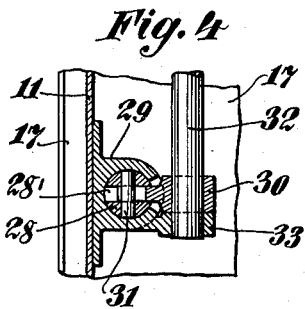
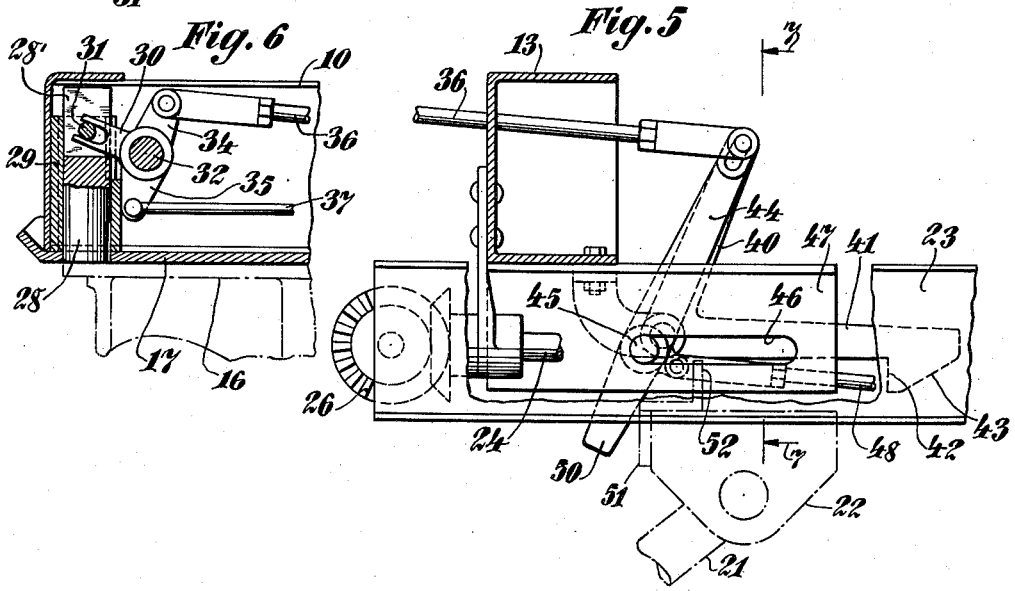
INVENTOR.
John Walker,
BY
HIS ATTORNEYS

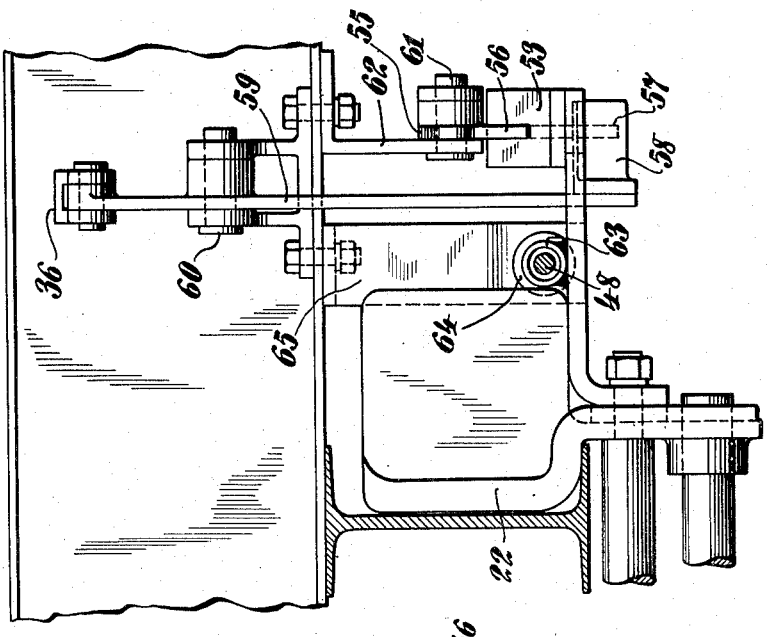

Patented June 9, 1936

2,043,342

UNITED STATES PATENT OFFICE 2,043,342

FIFTH WHEEL SAFETY DEVICE FOR SEMITRAILERS

John Walker, Westfield, N. J., assignor to International Motor Company, New York, N. Y., a corporation of Delaware Application May 27, 1935, Serial No. 23,596

5 Claims. (Cl. 280—33.1)

The present application is a continuation in part of applicant's application Serial No. 12,208, filed March 21, 1935 for Fifth wheel safety device for semitrailers.

The present invention relates to semitrailer mechanisms for motor vehicles and embodies, more specifically, an improved safety device by means of which the fifth wheel mechanism may function with greater safety and effectiveness than in existing constructions.

The invention relates, more specifically, to semitrailer fifth wheels wherein a safety mechanism is provided which functions automatically to prevent uncoupling the trailer from the tractor until such time as the props or support wheels have been lowered to a position that will independently support the trailer; the device is also arranged to prevent the raising of the support wheels of the trailer until such time that the semitrailer and tractor fifth wheel mechanism are properly engaged when making a coupling of the two units. It is further contemplated, in accordance with the present invention, to incorporate an interlock between the foregoing safety device and the brake mechanism of the semitrailer in order that the brakes may be applied during the time that the props or supporting wheels are in supporting position.

A further object of the invention is to provide a safety mechanism for the fifth wheel connection between tractors and semitrailers by means of which a positively operating interlocking mechanism is provided between the operating mechanism for the supporting wheels or props of the semitrailer and a locking mechanism which maintains the fifth wheel mechanism positively in a locked condition during predetermined positions of the supporting wheels.

It is a further object of this invention to provide a safety feature to prevent a separation of the tractor and semitrailer should any of the fifth wheel mechanism fail that normally secures the tractor and semitrailer to each other.

Further objects of the invention will be apparent as it is described in greater detail in connection with the accompanying drawings, wherein Figure 1 is a plan view of the chassis of a semitrailer provided with a safety mechanism constructed in accordance with the present invention;

Figure 3 is an enlarged detailed view in section taken through the fifth wheel latch pin and operating mechanism therefor, constructed in accordance with the present invention;

Figure 4 is a view in section taken on line 4—4 of Figure 3 looking in the direction of the arrows;

Figure 5 is an enlarged detailed view in section showing the mechanism by means of which the safety device is actuated by the supporting wheel operating mechanism;

Figure 6 is a view similar to Figure 3, showing the latch pin in its releasing position;

Figure 7 is a view in section taken on the line 7—7 of Figure 5 and looking in the direction of the arrows;

Figure 8 is a partial view, similar to Figure 5, showing a modified form of mechanism; and Figure 9 is a view in end elevation, looking from the right of Figure 8, and showing the elements of Figure 8.

Figure 1:
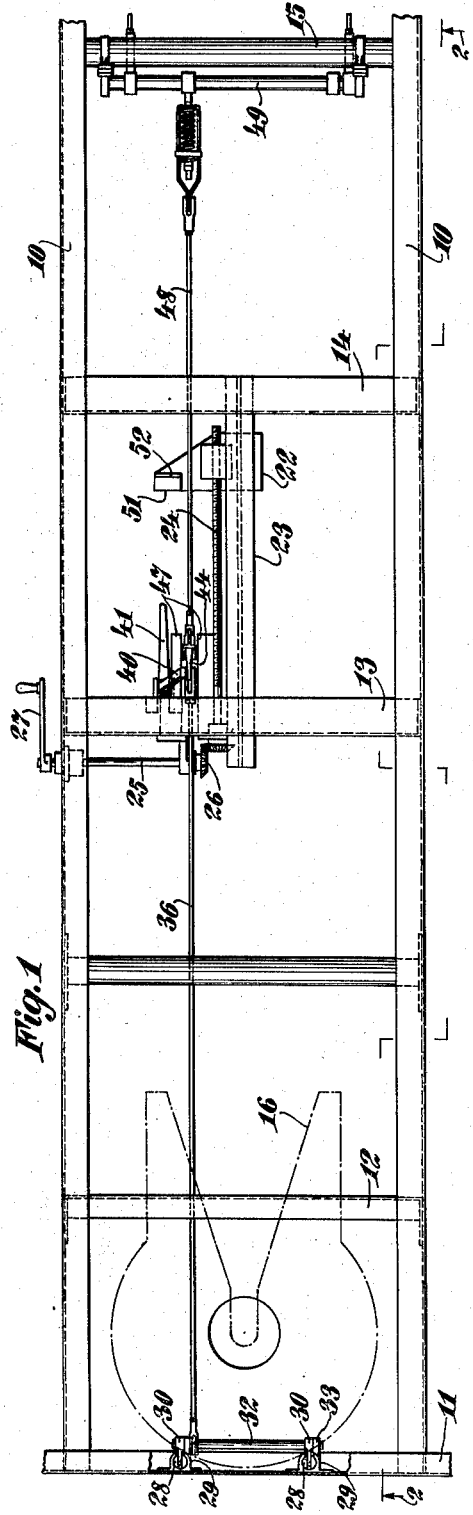

Referring to the above drawings, the chassis of a semitrailer is shown as being formed of longitudinal channel members 10 and a plurality of transverse channel members 11, 12, 13, 14 and 15. The number and shape of these transverse members, of course, is immaterial in so far as the present invention is concerned, these members merely serving as a supporting mechanism for the elements to be described presently.

As is usual in constructions of this character, the semi-trailer is adapted to be connected to a fifth wheel mechanism 16 (shown in dot and dash lines in the drawings), this fifth wheel mechanism being carried upon a tractor, the semitrailer being provided with a plate 17 which is adapted to lie upon a cooperating plate of the fifth wheel mechanism 16, suitable engaging elements being provided to constrain turning movements of the members to a predetermined and fixed vertical axis.

In order that the semi-trailer may be supported in a normal position when disconnected from the tractor, auxiliary support wheels 18 are provided, being mounted upon pedestals 19 which are journaled upon a transverse journal 20, suitably mounted upon the chassis of the semitrailer. The pedestals 19 may be actuated through a suitable mechanism such as a link 21 which is pivotally mounted upon a block 22, slidably mounted upon a track 23 and movable longitudinally by means of a screw 24 which may be rotated by a shaft 25 through a bevel gear connection 26. A manually operable crank 27 may be provided upon the end of shaft 25 and thus providing means for raising and lowering the wheels 18 in a convenient manner.

In order that the fifth wheel connection 16 may not be disconnected from the semitrailer while the support wheels 18 are elevated, one or more latch pins 28 are slidably mounted in suitably formed brackets 29, carried by the transverse member 11. These latch pins are shown in detail in Figures 3 and 6 and are adapted to engage the forward portions of the fifth wheel member 16 in order that it may not be disconnected while the latch pins are in the positions shown in Figure 3.

The latch pins may be provided with bifurcations 28' between which a yoke 30 is received to engage pins 31 on the latch pins 28. The yokes 30 are secured to a transverse shaft section 32 which is journaled upon arms 33 which are formed upon the brackets 29. The shaft 32 has fixed thereto oppositely extending arms 34 and 35 to which links 36 and 37 are respectively secured. Link 37 extends through the transverse member 12 and is formed with a shoulder 38 against which a compression spring 39 engages. Spring 39 thus urges the shoulder 38 to the right, as viewed in Figure 2, and serves to maintain the latch pins 28 normally in a latching position, as shown in Figure 3.

Link 36 is connected to an arm 40 of a bell crank lever which is journaled upon a transverse member 13. The bell crank lever is also formed with an arm 41 having a latching shoulder 42 provided with a cam nose 43. This latching shoulder 42 and cam nose 43 is adapted to engage a mechanism to be described presently.

Link 36 is also connected to a lever 44 which is formed with guide pins 45 which are adapted to move in guide slots 46, formed in parallel guide members 47, which are carried by the transverse member 13. The lever 44 is connected to a link 48 which is adapted to operate brake mechanism of the semi-trailer, this mechanism being of any suitable form. This brake mechanism may be controlled from a transverse shaft 49 which is carried upon the transverse member 15 of the semi-trailer chassis.

The lever 44 is also provided with a downwardly extending portion 50 which is adapted to be engaged by the block 22 and moved to the position shown in Figure 5 when the supporting wheels 18 are lowered, in order that the brake mechanism of the semitrailer may be operated. As the block 22 advances to the left, as viewed in Figure 2, the forward surface 51 thereof engages the downwardly extending portion 50 of the lever 44 to effect the foregoing actuation. During the movement of the block 22 to the left, as viewed in Figures 1 and 2, the cam surface 43 is engaged by an upwardly extending flange 52 to latch the supporting wheels in a supporting position and maintain them in such position during the time that the latch pin 28 is elevated by reason of the actuation of lever 44.

Figure 2:
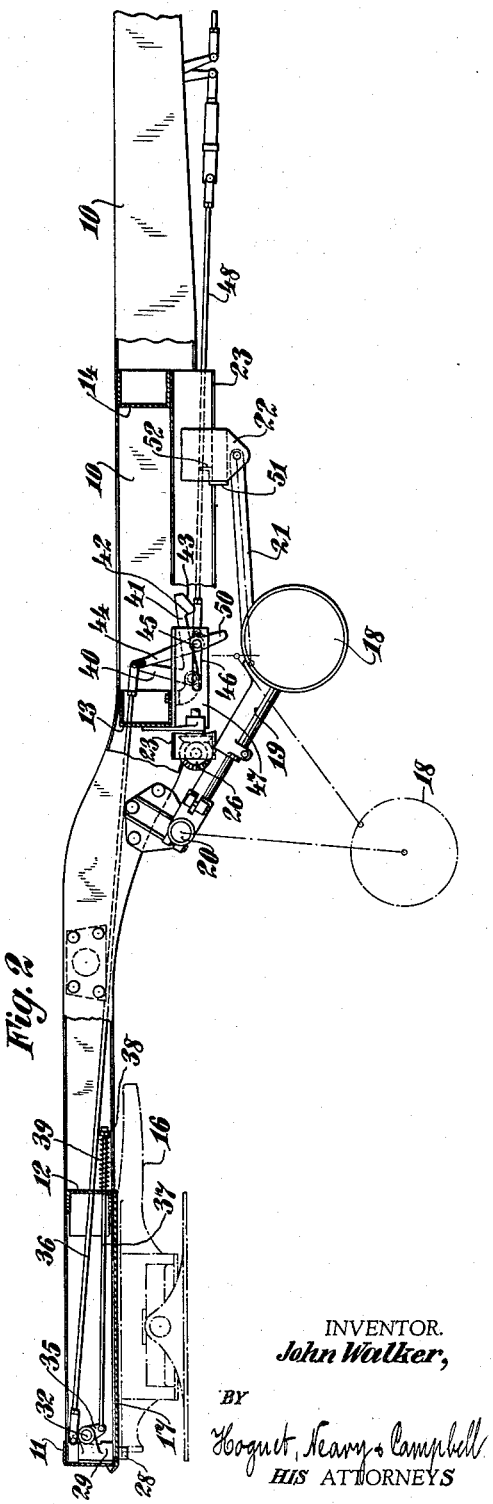
Figure 2 is a view in side elevation partly broken away and in section on the broken line 2—2 of Figure 1.

It will thus be seen that the latch pins 28 are in latching position during the time that the supporting wheels 18 are in the position shown in Figure 2, being maintained in such position by the spring 39. When the semitrailer is to be disconnected from the tractor the screw shaft 24 is turned to advance the block 22 to the left upon the guide track 23. This motion of the block is transmitted through the link 21 to the pedestal and supporting wheel structure, moving the same into the position indicated in dot and dash lines in Figure 2. As the block 22 approaches the end of its movement to the left, the flange 52 rides under the cam surface 43 and the latch shoulder 42 drops behind the flange, thus permitting only a limited movement of the block 22 to the right. Continued motion of the block 22 causes the surface 51 to engage the arm 50 and move the lever 44 to the left, thus applying the brake mechanism through the link 48 and moving the latch pins 28 into the position shown in Figure 6 through the link 36.

In the construction shown in Figures 8 and 9, a modified form of safety mechanism is shown, by means of which the actuation of the brake mechanism is more effectively controlled under certain conditions than in the construction shown in Figures 1 through 7. The operations of actuating the brake and moving the latch mechanisms by means of which the semitrailer is locked to the fifth wheel on the tractor are co-ordinated in such fashion that the brake mechanism will be maintained in an actuated condition if the operator of the mechanism attempts to crank up the supporting wheels when the latch pins are not properly engaged. The mechanism, obviously, will prevent the complete cranking up of the support wheels if the latch pins are not fully engaged to prevent uncoupling. As above noted, it is important that the brake mechanism and the latch mechanism not only be coordinated in such fashion that the brake mechanism will be applied when the latch mechanism is released, but it is important that a certain amount of motion of the support wheel actuating mechanism be accommodated without disturbing the application of the brake mechanism, in order that the latch mechanism may be operated.

In the construction shown in Figures 8 and 9, the nut 22 is provided with a flange 53 which is adapted to be engaged by a latching shoulder 54, formed upon an arm 55 which is provided with a cam face 56. The arm 55 is formed with a depending extension 57 which is adapted to be engaged by a flange 58, formed upon a lever arm 59 which is pivoted at 60 upon a stationary part of the semitrailer. The upper end of the lever 59 is connected to the link 36 to actuate the latching mechanism as shown in Figure 6. Arm 55 is pivoted at 61 upon a bracket 62 which is also secured to a stationary portion of the semitrailer frame.

The brake rod 48 is slidably mounted in a bushing 63 which is formed on or secured to the movable nut 22. The overhanging end of the brake rod 48 is provided with a sleeve 64 which is secured thereto and received in a fixed supporting arm 65 which is secured to a stationary portion of the semitrailer frame. The sleeve 64, being slidably mounted in the arm 65, thus serves as a support for the overhanging end of the brake rod 48 when the nut 22 is positioned so as to move the support wheels to a fully retracted position. When the nut 22 is moved into the position shown in Figure 8, at which time the support wheels are locked, the bushing 63 engages the end of sleeve 64 and applies the brakes. At the same time, the nut engages lever 59 and releases the latch mechanism 28.

If the latch pins 28 are prevented from going into engagement and the nut 22 is moved to the right until flange 53 engages the shoulder 54, the sleeve 64 and bushing 63 are still in engagement sufficiently to maintain the brake mechanism in an actuated condition, the relationship of the parts being such that the motion between the elements 53 and 54 does not effect disengagement of the brake mechanism. It will thus be seen that an effective interlock is provided between the latch mechanism and the brake mechanism and that the brakes of the semitrailer will always be applied except when the latch pins are in latching position regardless of the exact position of the nut 22 which controls the position of the support wheels.

When the semitrailer is to be coupled to the fifth wheel mechanism and the tractor fifth wheel is fully engaged with the semitrailer, the block 22 is then caused to move to the right thus releasing lever 44 and, before it reaches the end of the motion limited by the latch 41, the pins 28 will have dropped into the safety lock position, by reason of the motion of the block 22 having released the lever 44, at the same time releasing catch 41 from engagement with 52, thus permitting further motion of the block 22 and consequent raising of the support wheels 18. If in making the aforesaid coupling of the semitrailer and the tractor the fifth wheel on the tractor is not fully connected to the semitrailer, the pins 28 will be unable to drop into the safety position, thus preventing the disengagement of the latch 41, and also preventing further movement of the block 22. The function of the latch 41 thus prevents the raising of the support wheels until such time as the tractor and semi-trailer are properly engaged and the safety pins brought into engagement.

It will thus be seen that a positive interlock is provided between the brake mechanism and supporting wheel structure to anchor the semitrailer during the time when it is disconnected from the tractor, latching means also being provided to prevent the semitrailer from being disconnected from the tractor while the supporting wheels are in an elevated position. Moreover, the mechanism insures the proper positioning of the supporting wheels and the actuation of the brake mechanism prior to the release of the fifth wheel latch mechanism.

While the invention has been described with specific reference to the construction shown in the accompanying drawings, it is not to be limited save as defined by the appended claims.

I claim:

1. A safety device for semitrailers having a fifth wheel connecting mechanism, an auxiliary supporting wheel and means to move the supporting wheel from a retracted to a supporting position, comprising a first latch member adapted to engage the lower fifth wheel bearing plate, a second latch member to latch the supporting wheel in a supporting position, means operated by the first latch member to release the second latch member, means to actuate the first latch member by the auxiliary supporting wheel moving means, and means on the auxiliary supporting wheel moving means to be engaged by the second latch member to prevent movement of the said auxiliary supporting wheel moving means to a retracted position until the second latch member has been released by the first latch member.

2. A safety device for semitrailers having a fifth wheel connecting mechanism, an auxiliary supporting wheel and means to move the supporting wheel from a retracted to a supporting position, comprising a first latch member adapted to engage the lower fifth wheel bearing plate, a second latch member to latch the supporting wheel in a supporting position, means operated by the first latch member to release the second latch member, means to actuate the last named means by the auxiliary supporting wheel moving means, and means on the auxiliary supporting wheel moving means to be engaged by the second latch member to prevent movement of the said auxiliary supporting wheel moving means to a retracted position until the second latch member has been released by the first latch member.

3. A safety device for semitrailers having a fifth wheel connecting mechanism, an auxiliary supporting wheel and means to move the supporting wheel from a retracted to a supporting position, comprising a first latch member adapted to engage the lower fifth wheel bearing plate, a second latch member to latch the supporting wheel in a supporting position, means operated by the means to move the supporting wheel to actuate the first latch member, means movable with respect to the means to actuate the first latch member and actuated thereby to actuate the second latch member and means on the supporting wheel moving means to be engaged by the second latch member to prevent movement of the said supporting wheel moving means to a retracted position until the second latch member has been released by the first latch member.

4. A safety device for semitrailers having a fifth wheel connecting mechanism, an auxilary supporting wheel and means to move the supporting wheel from a retracted to a supporting position, comprising a first latch member adapted to engage the lower fifth wheel bearing plate, a second latch member to latch the supporting wheel in a supporting position, means operated by the means to move the supporting wheel to actuate the first latch member, means to mount the second latch member independently of the last named means and to be actuated thereby, and means on the supporting wheel moving means to be engaged by the second latch member to prevent movement of the said supporting wheel moving means to a retracted position until the second latch member has been released by the first latch member.

5. In a semitrailer having an auxiliary supporting wheel with brake actuating means and a latch member to engage a fifth wheel connection, a block and means connected thereto to actuate the auxiliary supporting wheel, a lost motion connection between the block and brake actuating means, a second latch member pivoted on the semi-trailer to engage and hold the block and supporting wheel in supporting position, means mounted on the semitrailer to actuate the first latch member, and means operated by the block to actuate the last named means.

JOHN WALKER.